Oct. 18, 1960    Y. CONWELL ET AL    2,956,306
PROCESS FOR THE EXTRUSION OF POLYETHYLENE
Filed June 21, 1954
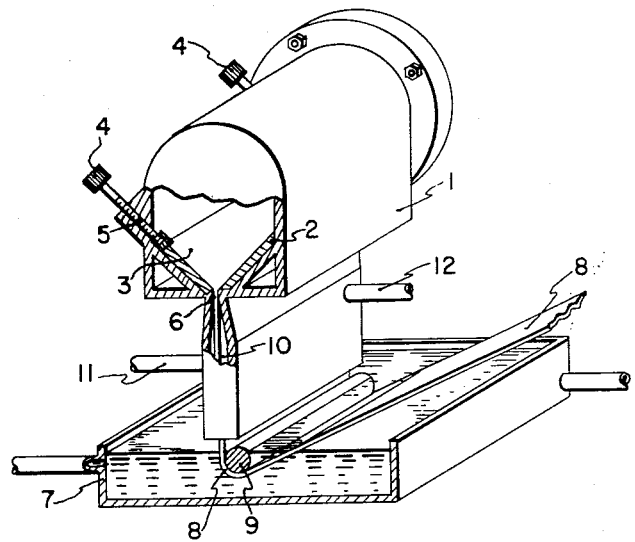
INVENTORS,
YEATES CONWELL,
WILLIAM B. HAPPOLDT, JR.,
ERNEST EUGENE LEWIS
BY
ATTORNEY 2,956,306
Patented Oct. 18, 1960

2,956,306

PROCESS FOR THE EXTRUSION OF POLYETHYLENE

Yeates Conwell, Landenberg, Chester County, Pa., William B. Happoldt, Jr., Claymont, Del., and Ernest Eugene Lewis, Chadds Ford, Chester County, Pa., assignors to E. I. du Pont de Nemours and Company, Wilmington, Del., a corporation of Delaware Filed June 21, 1954, Ser. No. 438,063

3 Claims. (Cl. 18—47.5)

This invention relates to the extrusion of the solid polymers of ethylene in the form of filaments, films, threads, sheets, bands and other shapes, as well as superior ethylene polymer compositions for such purposes.

Many different types of processes are known for the extrusion of plastic materials. These processes include the extrusion of solutions and other types of plastic-containing compositions through spinnerets to form filaments, the extrusion of doughy plastic compositions and melts through extrusion slits to produce sheets, tubes, cylinders and other objects. High costs of materials and apparatus with overhead charges make it imperative that extrusion speeds be increased as high as quality of product and capacity of the equipment used will permit.

An object of the invention is to provide an ethylene polymer composition that can be melt extruded at a high rate. Another object is to provide a melt drawing aid to permit rapid production of filaments, films, threads, sheets, bands and the like from the solid polymers of ethylene. Other objects and advantages of the invention will appear hereinafter.

The above and other objects are accomplished by the invention which constitutes a solid polymer of ethylene composition capable of being extruded at high rates from the molten state into formed shapes, the polymer containing a drawing aid and preferably being surrounded during extrusion by an enclosed atmosphere. The drawing aid more specifically described hereinafter has been found capable, even though present in extremely low concentrations, of markedly improving the rate at which the molten polymer can be stretched after it is extruded. Moreover, the invention contemplates the use, with or without the drawing aid, of an enclosed environment in or through which the molten polymer is extruded.

Films from solid polymers of ethylene can be manufactured in many ways. A favored procedure in commercial practice is to extrude a comparatively thick film and then, while it is still plastic, pull it into a thin film by increasing the velocity or linear rate of film production.

The single figure diagrammatically illustrates in cross-sectional perspective one type of apparatus suitable for the extrusion of the solid polymers of ethylene from a melt into a thin film. Numeral 1 designates a hopper into which a molten, normally solid polymer of ethylene, at a temperature between 200 and 350° C., is charged by means of the screw of a suitable extrusion device or other means known to the art, not shown. Hopper 1 is provided with a stationary blade 2 and an adjustable blade 3, adjustment being by means of thumb screws 4 threaded through lugs 5, the latter being secured to one wall of the hopper 1 on the opposite side of the fixed blade as shown. By this means blade 3 may be moved toward or away from blade 2 to adjust the width of the slit 6 through which the molten polymer is being forced. Tank 7 is positioned below the hopper and filled to the level shown with a suitable liquid for solidifying the polymer film 8 by cooling. A suitable gap is provided between the slit 6 and the surface of the cooling liquid. In this space the polymer, while still plastic, after extrusion from slit 6 is drawn down to the desired film thickness which may be from ½ to ¹⁄₁₀₀ of the setting of the slit 6. The thin film then enters the quench tank, which preferably is water, although it may be any other suitable non-solvent cooling liquid. The film 8 passes into the fluid in the tank and around guide roll 9 from which the film is drawn by a pair of pick-up rolls, not shown, that provides a velocity sufficient to make the desired thickness of the film at the volume rate of extrusion under which the apparatus is being operated. At any predetermined extrusion condition of temperature, melt delivery, volume rate of extrusion, opening of slit, length of air gap, and width of the film, an increase of the linear velocity will result in decreased thickness of the film. It is well known in the art that under such conditions a minimum thickness (or maximum linear velocity) is reached beyond which the film breaks. The invention is directed to means for increasing the maximum linear rate of extrusion (i.e. decreasing the minimum thickness of the film) at break.

One embodiment of the invention involves maintaining a closed atmosphere about the film during the time between its extrusion from slit 6 and its immersion in the fluid cooling bath. During this period it passes through the atmosphere provided in chamber 10. In this enclosed chamber an inert gas may be provided which can be air or any other suitable gas passed into the chamber 10 by conduit 11 and from the chamber through conduit 12. Suitable baffles, not shown, may be provided in chamber 10 to avoid direct impingement of gas stream on the film. The gas is preferably at a temperature above 100° C., usually in the range of 120 to 150° C.

The closed atmosphere about the extruded polymer prior to its solidification (whether the polymer is solidified and cooled in a liquid bath as shown or by slower cooling through a bath of vapors), not only increases the possible linear rate at which the extrusion can be carried out but also improves the quality of the extruded product. The reason for this improvement is not fully understood. Without the closed atmosphere about the orifice or slit through which the molten polymer is being extruded, small particles of polymer adhere to the edges of the orifice or slit causing streaks or scratches in the finished film. As a consequence, the linear rate at which it is possible to pull the molten polymer away from the orifice or slit without breakage is decreased from that obtainable with a closed atmosphere about the molten extruded polymer. The defects described are particularly noticeable upon starting up after a shut-down of the normal extrusion process, and the use of the closed atmosphere is advantageous in preventing this occurrence. When the closed atmosphere is provided around the lip of the orifice or slit and a comparatively quiescent inert atmosphere is maintained, the accumulation of polymer on the lip of the orifice or slit is minimized. When this closed atmosphere is provided, the vapors, which contain oils and waxes, given off during the extrusion process appear to lubricate the lip of the orifice or slit preventing the adhesion of particles of polymer, thus preventing the formation of streaks and scratches.

The drawing illustrates one type of apparatus that may be used in carrying out a preferred embodiment of the invention. A skilled engineer of this art will appreciate that similar apparatus may be provided for extruding the molten polymer from a spinnerette, slot or non-reactangular opening through a chamber of any suitable shape into a fluid bath of liquid or vapor, as shown, or through a tube or chamber of sufficient length to solidify the polymer prior to its withdrawal therefrom.

The improved products obtained by and the increased linear rate of draw permitted by the enclosed atmosphere about the freshly extruded polymer are further augmented if 2,6-di-t-butyl-4-methyl phenol is added to the polymer prior to or during extrusion. This drawing aid may be introduced into the polymer at any time prior to its extrusion, just before or during extrusion. For example, it may be mixed with the solid polymer prior to its heating to the melt stage or, for that matter, may be added just after the polymerization of the ethylene to form the normally solid polymers. Only small amounts are needed to give outstanding improvements in operation, as low as 0.0005% by weight having been found to be effective while amounts above 0.02% appear to be undesirable. Generally speaking the 2,6-di-t-butyl-4-methyl phenol should be present to the extent of from 0.001 to 0.02% and preferably between 0.005 and 0.01% by weight of the polymer.

This drawing aid is used in amounts well below the amounts needed for the purpose of protecting the polymers from oxidation during the extrusion process, which is between about 0.1 to 1.0% by weight of the polymer. These amounts invariably produce objectionable odor during processing, increase the blocking of films and the coefficient of friction or render the polymer colored and unsuitable for comestible wrappings. Moreover, transparency of the film is improved up to about 0.02% by weight of the 2,6-di-t-butyl-4-methyl phenol when extruded at temperatures of 250° C. to 300° C. Blocking, i.e., the tendency of the films to stick together on stacking is slight below 0.02% but increases above this percentage of the drawing aid.

The advantageous results of the invention are illustrated by this example. Solid polymers of ethylene extruded at a temperature of 300° C. and containing no drawing aid, when extruded into water in an apparatus such as is illustrated by the drawing, and with air at a temperature between 120 and 150° C. circulating through the chamber 10, produced film at a linear rate of 10 to 15% over that with no enclosed atmosphere about the extruding film. With 0.005% 2,6-di-t-butyl-4-methyl phenol in the polymer, the linear rate of film production was increased an additional 20 to 60% depending on the initial extrudability of the polymer.

The outstanding ability of the drawing aid of the invention to improve the rate at which a solid polymer of ethylene containing it can be extruded is illustrated in the table. The percentage change in draw over a control containing no drawing aid and over other compositions added to the polymer for the same purpose is shown:

*Table*

Percent change in draw over control

| | |
|---|---|
| t-Hexadecyl mercaptan | +13 |
| 2-mercapto benzimidazole | +20 |
| Stearyl thiodipropionate | −6 |
| Condensation product of 9 mols of p-cresol and 1 mol of t-butyl-p-cresol with butyraldehyde | +18 |
| Propyl gallate | +3 |
| 2,6-di-t-butyl-4-methyl phenol | +23 |

It is also within the scope of this invention to extrude the normally solid polymers of ethylene from melts with the extrusion aid or with the enclosed atmosphere or with both the aid and the atmosphere to give solid shapes and forms of comparatively large cross-sectional dimensions, although the optimum advantages of the invention are realized with objects of cross-sectional area having at least one small dimension.

We claim:

1. In a process for the extrusion of solid polymers of ethylene as elongated shapes and for stretching the forming shape, the steps which comprise melting a normally solid polymer of ethylene, containing from 0.0005% to 0.02% by weight of 2,6-di-t-butyl-4-methyl phenol, extruding the melt into an elongated shape and thereafter, while the polymer remains plastic, stretching the shape to from ½ to 1/100 of its original thickness.

2. In a process for the extrusion of solid polymers of ethylene as elongated shapes and for stretching the forming shape, the steps which comprise melting a normally solid polymer of ethylene, containing from 0.005% to 0.01% by weight of 2,6-di-t-butyl-4-methyl phenol, extruding the melt into an elongated shape and thereafter, while the polymer remains plastic, stretching the shape to from ½ to 1/100 of its original thickness.

3. In a process for increasing the rate of film production from a polymer of ethylene, the steps which comprise melting a normally solid polymer of ethylene, containing from 0.0005% to 0.02% by weight of 2,6-di-t-butyl-4-methyl phenol, extruding the melt into the shape of a film and thereafter, while the film remains plastic, stretching the film to from ½ to 1/100 of its extruded thickness.

References Cited in the file of this patent

UNITED STATES PATENTS

| | | |
|---|---|---|
| 2,360,864 | Fryling | Oct. 24, 1944 |
| 2,471,887 | Nelson | May 31, 1949 |
| 2,566,537 | Schmerling | Sept. 4, 1951 |
| 2,625,491 | Young et al. | Jan. 13, 1953 |
| 2,698,463 | Conwell et al. | Jan. 4, 1955 |

FOREIGN PATENTS

| | | |
|---|---|---|
| 701,468 | Great Britain | Dec. 23, 1953 |

OTHER REFERENCES

Modern Plastics, volume 31, No. 7, March 1954, page 49.